United States Patent

US010035914B2

(10) Patent No.: US 10,035,914 B2
(45) Date of Patent: Jul. 31, 2018

Rao et al.

(54) INORGANIC BLUE PIGMENTS FROM COBALT DOPED MAGNESIUM HAVING TRANSITION ELEMENT OXIDES AND A PROCESS FOR THE PREPARING THE SAME

(71) Applicant: Council of Scientific and Industrial Research, New Delhi (IN)

(72) Inventors: Padala Prabhakar Rao, Thiruvananthapuram (IN); Saraswathy Divya, Thiruvananthapuram (IN)

(73) Assignee: Council of Scientific and Industrial Research, New Delhi (IN)

( * ) Notice: Subject to any disclaimer, the term of this patent is extended or adjusted under 35 U.S.C. 154(b) by 15 days.

(21) Appl. No.: 15/311,423

(22) PCT Filed: Sep. 22, 2015

(86) PCT No.: PCT/IN2015/050116
§ 371 (c)(1),
(2) Date: Nov. 16, 2016

(87) PCT Pub. No.: WO2016/046846
PCT Pub. Date: Mar. 31, 2016

(65) Prior Publication Data
US 2017/0198145 A1  Jul. 13, 2017

(51) Int. Cl.
| | |
|---|---|
| *C09C 1/02* | (2006.01) |
| *C09C 1/36* | (2006.01) |
| *C08K 3/22* | (2006.01) |
| *C09C 1/00* | (2006.01) |
| *C09D 17/00* | (2006.01) |

(52) U.S. Cl.
CPC ............... *C09C 1/02* (2013.01); *C08K 3/22* (2013.01); *C09C 1/0009* (2013.01); *C09C 1/36* (2013.01); *C09D 17/007* (2013.01); *C01P 2002/72* (2013.01); *C01P 2002/84* (2013.01); *C01P 2002/88* (2013.01); *C01P 2004/61* (2013.01); *C01P 2006/60* (2013.01); *C01P 2006/62* (2013.01); *C01P 2006/63* (2013.01); *C01P 2006/64* (2013.01); *C08K 2003/2237* (2013.01); *C08K 2003/2258* (2013.01)

(58) Field of Classification Search
CPC ........... C09C 1/02; C09C 1/0009; C09C 1/36; C09D 17/007; C08K 3/22; C08K 2003/2258; C08K 2003/2237; C01P 2006/60; C01P 2006/62; C01P 2006/63; C01P 2006/64; C01P 2004/61; C01P 2002/88; C01P 2002/84; C01P 2002/72
See application file for complete search history.

(56) References Cited

U.S. PATENT DOCUMENTS

| | | | | |
|---|---|---|---|---|
| 3,424,551 A | * | 1/1969 | Owen ....................... | C09C 1/36 |
| | | | | 106/430 |
| 3,748,165 A | | 7/1973 | Hill | |
| 5,252,126 A | | 10/1993 | Speer et al. | |
| 5,721,182 A | * | 2/1998 | Reichert ............... | C01B 13/185 |
| | | | | 501/134 |
| 5,874,056 A | * | 2/1999 | Bludssus ................ | C01G 41/00 |
| | | | | 423/594.13 |
| 8,282,728 B2 | | 10/2012 | Subramanian et al. | |
| 2009/0223414 A1 | | 9/2009 | Sanada | |

FOREIGN PATENT DOCUMENTS

| | | | | |
|---|---|---|---|---|
| CN | 102992755 A | * | 3/2013 | ........... C04B 35/465 |
| JP | 5-51576 A | * | 3/1993 | ............. C09K 11/02 |
| WO | WO-2016/046846 | | 3/2016 | |

OTHER PUBLICATIONS

"International Application No. PCT/IN2015/050116, International Search Report and Written Opinion dated Feb. 26, 2016", (Feb. 26, 2016), 10 pgs.
Llusar, M., et al., "Colour analysis of some cobalt-based blue pigments", Journal of the European Ceramic Society 21 (2001) 1121-1130, (Oct. 10, 2000), 1121-1130.
Torkian, Leila, et al., "Simple and Efficient Rout for Synthesis of Spinel Nanopigments", Journal of Chemistry, vol. 19, Jan. 1, 2013, Article ID 694531, (Jul. 29, 2013), 1-6.
Jose, Sheethu, et al., "Lanthanum—strontium copper silicates as intense blue inorganic pigments with high near-infrared reflectance", *Dyes and Pigments*, 98(3), (2013), 540-546.
Li, Lingxia, et al., "Effect of $Co_2O_3$ Additive on the Microstructures and Dielectric Properties of $MgTiO_3$ Ceramics", *Ferroelectrics*. 388(1), (2009), 167-171.
Llusar, M., et al., "Blue-violet ceramic pigments based on Co and Mg $Co_{2-x}Mg_xP_2O_7$ diphosphates", *Journal of the European Ceramic Society*, 30(9) (Jul. 2010), 1887-1896.
Ocaña, M., et al., "Synthesis, through pyrolysis of aerosols, of $YIn_{1-x}Mn_xO_3$ blue pigments and their efficiency for colouring glazes", *Dyes and Pigments*, 91(3), (Dec. 2011), 501-507.
Pina, P. C., et al., "Study of Ilmenite CoMgTiO System", *Key Engineering Materials*, vol. 206-213,, (2002), 67-70.
Radhika, Sri Parasara, et al., "Rare earth doped cobalt aluminate blue as an environmentally benign colorant", *Journal of Advanced Ceramics*, 1(4), (Dec. 2012), 301-309.

* cited by examiner (Continued)

*Primary Examiner* — Anthony J Green
(74) *Attorney, Agent, or Firm* — Schwegman Lundberg & Woessner, P.A.

(57) ABSTRACT

The present invention relates to a new Inorganic Blue pigments from Cobalt doped Magnesium having Transition Element Oxides and a process for the preparing the same. The present invention more particularly relates to the development of blue pigments, comprising oxides of alkaline earth, and transition metals of the general formula $Mg_{1-x}Co_xWO_4$ (x=0.1 to 0.5), $Mg_{1-x}Co_xN$-$bO_6$ (x=0.1 to 0.5), and $Mg_{1-x}Co_xTiO_3$ (x=0.1 to 0.5) and well suited for coloring applications of a wide variety of substrates for example paints, varnishes, plastics, ceramics etc. Raw materials such as MgO, CoO and one of $WO_3$, $TiO_2$, $Nb_2O_5$ and are weighted in the stoichiometric ratio and calcined in the range 1100-1300° C. for 6-12 hrs duration in air atmosphere. The well ground calcined powders were used for characterization of the pigments. The phase purity and optical properties of the prepared pigments were investigated.

10 Claims, 12 Drawing Sheets

INORGANIC BLUE PIGMENTS FROM COBALT DOPED MAGNESIUM HAVING TRANSITION ELEMENT OXIDES AND A PROCESS FOR THE PREPARING THE SAME

PRIORITY CLAIM TO RELATED APPLICATIONS

This application is a U.S. national stage application filed under 35 U.S.C. § 371 from International Application Serial No. PCT/IN2015/050116, which was filed 22 Sep. 2015, and published as WO2016/046846 on 31 Mar. 2016, and which claims priority to India Application No. 2706/DEL/2014, filed 22 Sep. 2014, which applications and publication are incorporated by reference as if reproduced herein and made a part hereof in their entirety, and the benefit of priority of each of which is claimed herein.

FIELD OF INVENTION

The present invention relates to the development of blue pigments from Cobalt doped Magnesium having Transition Element Oxides and a Process for preparing the same. The present invention particularly relates to blue pigments (i) $Mg_{1-x}Co_xWO_4$ (ii) $Mg_{1-x}Co_xNb_2O_6$ and (iii) $Mg_{1-x}Co_xTiO_3$ well suited for colouring applications of a wide variety of substrates for example paints, varnishes, plastics, ceramics etc.

BACKGROUND OF INVENTION

Inorganic pigments are coloured compounds with a high thermal and chemical stability used to colour ceramic bodies. Pigments are used in a wide range of applications including paints, inks, plastics, rubbers, ceramics, enamels, and glasses. Many of these materials consist of an oxide matrix doped with transition metal cations that act as chromophore. One of the main research activities in this field is the search for new inorganic structures that, once doped with proper chromophore ions, result in new pigments that are cheaper, less toxic, or have more attractive shades than the currently used pigments. The brilliant colours of the inorganic pigments are usually due to selective absorption of visible light.

Numerous $Co^{2+}$ ($3d^7$) based oxides exhibit strong violet or blue coloration as well as a light pink hue and have been used as pigments. The UV-vis-NIR absorption properties are strongly related to the structural features and especially to the local environment of transition metals. Commercially used blue pigments are Co—Cr—Al (P.B.36) and Co—Al (P.B.28) and others are Ultramarine blue, Prussian blue, cobalt phosphates such as $Co_3(PO_4)_2$, $Co_2SiO_4$ (olivine), Co-Willemite, $(Zn_2SiO_4)$ etc. There is an increasing demand to develop new NIR reflective pigments which are can be used for cool roof applications. A cool roof reflects and emits the sun's heat back to the sky instead of transferring it to the building. Replacing conventional pigments with "cool pigments" that absorb less NIR radiation can provide coatings similar in color to that of conventional roofing materials, but with higher solar reflectance. Taking into account these previous investigations, the aim of the present study is to develop and characterize for the new low-toxicity and NIR reflecting ceramic pigments.

Inorganic pigments comprising of cobalt and aluminum having spinel structure most commonly produced by high temperature calcinations of raw materials such as cobalt (II) oxide(CoO), and aluminum(III) oxide($Al_2O_3$). Inorganic pigments comprising cobalt and aluminum having the spinel structure are used in a variety of applications including paints and polymers. Paints and polymers containing such inorganic pigments are often exposed to UV radiation and other environmental conditions. The intensity and color of paints and polymer products containing such inorganic pigments tend to degrade upon extended exposure to the environment. These conventional cobalt aluminate spinel pigments are synthesized at a high temperature (1300° C.).

U.S. Pat. No. 5,252,126, Oct. 12, 1993, describes a process for the preparation of neutral blue vanadium-zirconium inorganic blue pigment. In order to produce such pigments, a zirconium free mixture of powdery $ZrO_2$ and $SiO_2$ source, a vanadium compound and a phosphorus compound with an atomic ratio of Zr:Si:V:P=(0.95-1.10):(0.05-0.20):(0.005-0.03) as well as of fluoride mineraliser is annealed after intensive grinding at 700° C. to 900° C. The neutral blue pigment with a rather high color intensity and good reproducibility are doped in the host lattice with phosphorus addition to vanadium. However these pigments have less colour intensity than commercially available $CoAl_2O_4$ spinel.

A novel non-toxic intense blue near-infrared reflecting inorganic pigments having the general formula $Sr_{1-x}La_xCu_{1-y}Li_ySi_4O_{10}$ (x=y ranges from 0 to 0.5) were developed as viable alternatives to existing blue colorants. (Sheethu Jose, M. L. Reddy *Dyes and Pigments* 98 (2013) 540-546). The substitution of $La^{3+}$ for $Sr^{2+}$ and $Li^+$ for $Cu^{2+}$ in $SrCuSi_4O_{10}$ gently changes the color of the pigment from sky-blue to intense blue. The developed pigments exhibit intense blue color with impressive NIR solar reflectance (67%) and thermally stable.

U.S. Pat. No. 3,748,165, Jul. 24, 1973 describes a process for the preparation of an improved inorganic pigment of spinel structure which comprises of about 15 to about 50 mole percent of nickel aluminate in cobalt aluminate. The improved pigment retains a greater degree of blueness when diluted 1 to 10 with $TiO_2$ pigment than either $CoAl_2O_4$ or $NiAl_2O_4$ pigment. However the calcinations are generally carried out by heating at least to 1300° C. for about 30 hrs.

Embodiments of compositions comprising materials satisfying the general formula $AM_{1-x}M^1{}_xM^2{}_yO_{3+y}$, are disclosed, along with the methods of making the compositions in some cases the M and $M^1$ cations in trigonal bipyramidal coordination, and the material is chromophoric. In some embodiments, the material is $YIn_{1-x}Mn_xO_3$, X is greater than 0.0 less than 0.75, and the material exhibits a surprisingly intense blue colour (U.S. Pat. No. 8,282,728 B2, Oct. 9, 2012).

Solid solutions of Co and Mg diphosphates with compositions $Co_{2-x}Mg_xP_2O_7$ (x=0, 0.1, 0.2, 0.3, 0.5, 0.7, 1.0, 1.5 and 1.8) have been prepared and characterized by M. Llusar et al. (M. Llusar, A. Zielinska, M. A. Tena, J. A Bardenes, G. Monros *Journal of European Ceramic Society* 30 (2010) 1887-1896) for the first time as alternative low-toxicity blue ceramic pigments. The compositions were prepared through the conventional co-precipitation route and calcined up to 1000° C./2 h. These optimal compositions containing a minimized Co amount (measured values around 7-16 wt %) could be therefore less toxic alternatives to the conventional $Co_3(PO_4)_2$ blue ceramic pigment are now under development. These pigments possess relatively less −b* value than $CoAl_2O_4$. The value of L*, a+, b+ and NIR solar reflectance (%) of commercial $CoAl_2O_4$ are 44.8, 2.1, −32.7 [M. Ocaila, J. P. Espinos, J. B. Carda, Dyes Pigm., 91, 2011, 501-507] and 29%[S. P. Radhika, K. J. Sreeram, B. U. Nair, J. Adv. Ceram., 1, 2012, 301-309].

OBJECTIVES OF THE INVENTION

The primary and most important objective of the present invention is to provide a blue inorganic pigment that comprises oxides of alkaline earth, cobalt and transition metals (W, Nb, and Ti). These colorants can be used to form colored objects or coatings through their use in applications such as paints, plastics, glasses, ceramics and the like.

Accordingly the present invention provides the synthesis and characterization of new inorganic blue pigments comprising of alkaline earth, Cobalt, and transition metal oxides. The invention comprises the synthesizing conditions and optical properties of pigments.

The first embodiment comprises synthesis of $Mg_{1-x}Co_xWO_4$ inorganic blue pigment by the solid state route using the starting materials MgO, CoO and $WO_3$. The phase purity and colour properties using CIE-LAB 1976 colour scales of the synthesized pigments were characterized.

Yet another embodiment of the present invention comprises the synthesis and characterization of blue inorganic pigments having the formula, $Mg_{1-x}CO_xNb_2O_6$.

In another embodiment of the present invention comprises preparation of $Mg_{1-x}Co_xTiO_3$ inorganic blue pigment through the solid state route. The starting materials were MgO, CoO and $TiO_2$. The phase purity and optical properties of the prepared pigments were investigated.

BRIEF DESCRIPTION OF THE FIGURES

For a better understanding of the invention an exemplary embodiment is described below considered together with the figures in which.

It is to be understood that the plots are only for the purpose of illustrating the examples without limiting the scope thereof.

SUMMARY OF THE INVENTION

Blue pigment comprising Cobalt doped Magnesium and one Transition Element Oxides selected from Tungsten, Niobium and Titanium and a Process for preparing the same. The present invention particularly relates to blue pigments (i) $Mg_{1-x}Co_xWO_4$ (ii) $Mg_{1-x}Co_xNb_2O_6$ and (iii) $Mg_{1-x}Co_xTiO_3$ well suited for colouring applications of a wide variety of substrates for example paints, varnishes, plastics, ceramics etc.

DETAILED DESCRIPTION OF THE INVENTION

The detailed description of these inventions was explained with following examples but these should not construe to limit the invention:

Example 1

Preparation of $Mg_{1-x}Co_xWO_4$ Blue Pigment

Figure 1:
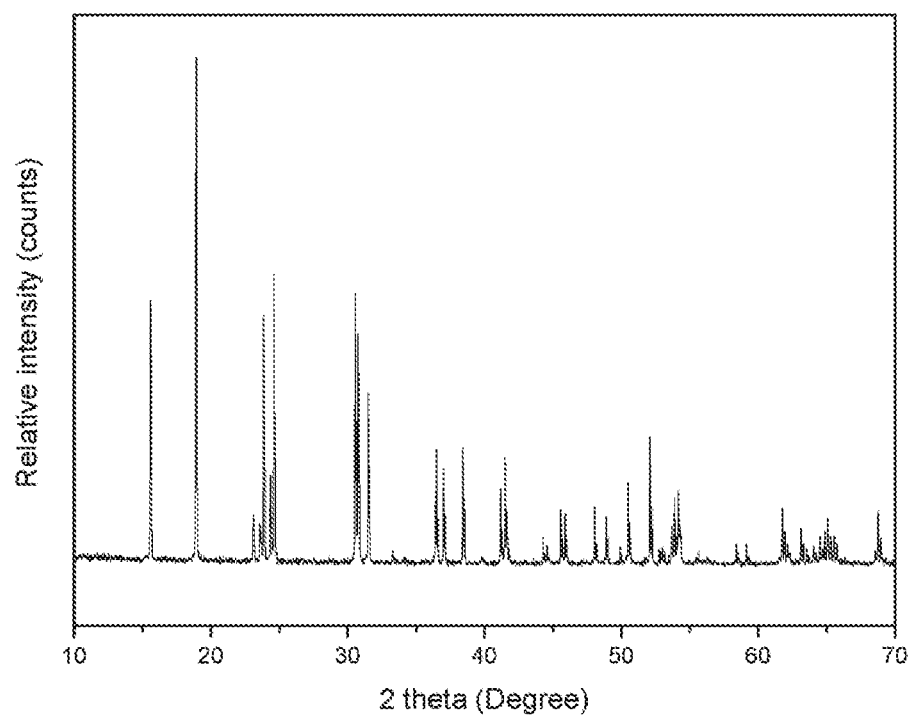
FIG. 1. Powder X-ray diffraction pattern of $Mg_{1-x}Co_xWO_4$ (x=0.2) pigments.
Figure 2:
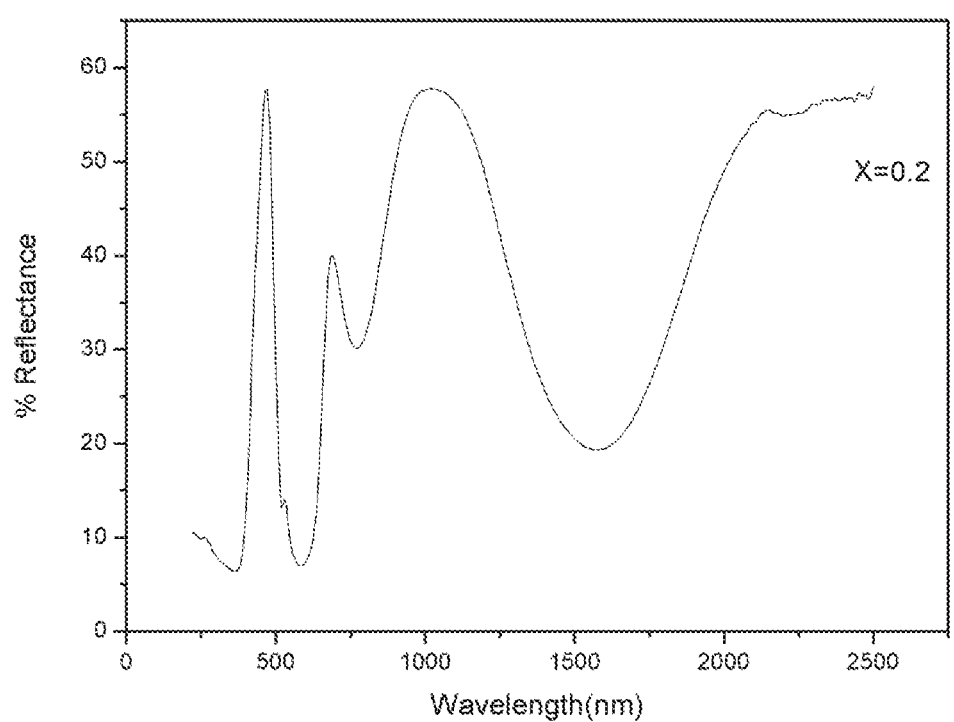
FIG. 2. Diffuse reflectance spectra of $Mg_{1-x}Co_xWO_4$ (x=0.2) pigments.

This example relates to the preparation of $Mg_{1-x}Co_xWO_4$ (x=0.1, 0.2, 0.3, 0.4 &0.5). MgO (purity 99%) $WO_3$ (purity 99.995%) and CoO (99.99%) were thoroughly mixed in the stoichiometric ratio in agate mortar with a pestle. The mixture was calcined at 1100° C. for 12 h in air. The obtained powders were examined by means of X-ray powder diffraction (XRD) using Ni filtered $CuK\alpha 1$ radiation with a Philips X'pert Pro diffractometer. $MgWO_4$ crystallizes in a monoclinic structure isomorphic to wolframite, with a space group P21c and has $C_{2h}$ point-group symmetry. The structure consists of layers of alternating $MgO_6$ and $WO_6$ octahedral units that share edges forming a zigzag chain. FIG. 1 shows the XRD patterns of cobalt doped $MgWO_4$. All the diffraction peaks can be indexed to the monoclinic structure with P2/c space group in agreement with the JCPDS file No (01-073-0562). Morphological analysis was performed by means of scanning electron microscope with a JEOL JSM-5600LV SEM. The particle size of the pigment varies in the range 1-2.5 am. Optical reflectance of the powders was measured with UV-Vis spectrophotometer (Shimadzu, UV-2450) using PTFE as a reference is shown FIG. 2. The chromaticity coordinates, determined by the CIE-LAB 1976 colour scales. The values a* (the axis red-green) and b* (the axis yellow-blue) indicate the colour hue. The value L* represents the lightness or darkness of the colour as related to a neutral grey (Table 1). The colouring performance of cobalt bearing pigments depends very much on the coordination of $Co^{2+}$ ions. In order to understand the origin of blue colour of the $Mg_{1-x}Co_xWO_4$ powders we take the UV-Visible NIR spectrum. The given spectrum contains mainly three bands attributed to the three spin allowed transitions $^4T_{1g}(^4F)$-$^4T_{2g}(v_1)$, $^4T_{1g}(^4F)$-$^4A_{2g}(v_2)$, $^4T_{1g}(^4F)$-$T_{1g}(^4P)(v_3)$ appear at 1500 nm, 730 nm and 580 nm respectively. These are the three spin allowed transitions of $CoO_6$ chromophore.

L*=46.28, a*=6.33, b*=−46.97 (x=0.2) &L*=42.54, a*=4.46, b*=−43.2 (x=0.3)

For the Purpose of evaluating the chemical and thermal stability of the synthesized pigments, we treated it with acid and alkali (Table 2). For this a small amount of weighed sample is mixed with 2% NaOH and 2% HCl and immersed for 1 hour with constant stirring.

Figure 3:
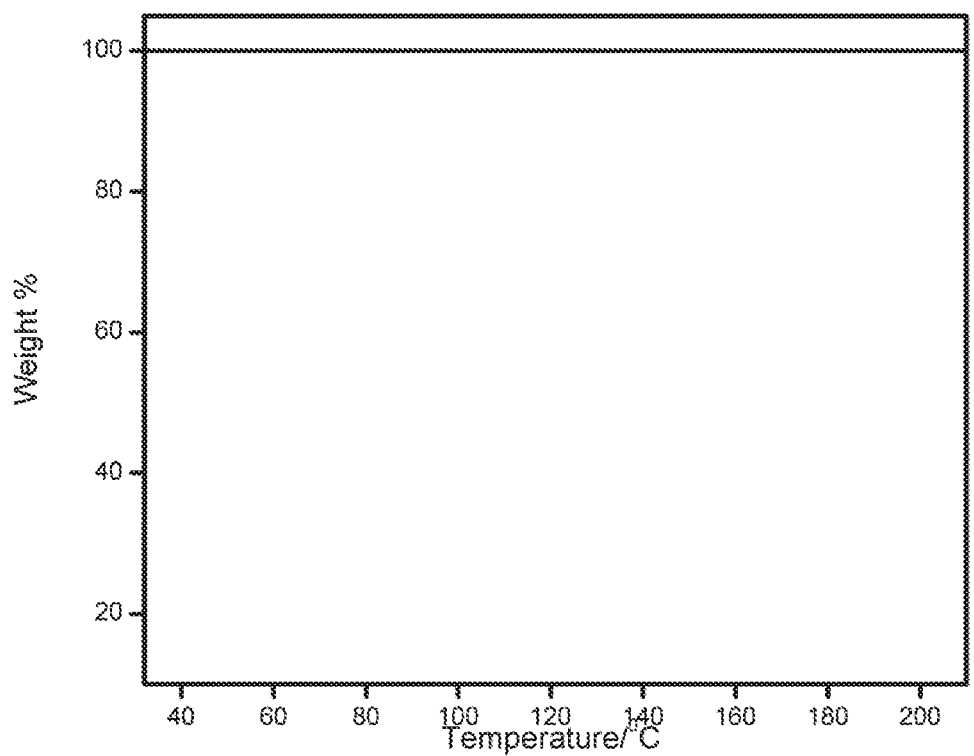
FIG. 3. TGA of $Mg_{1-x}Co_xWO_4$ (x=0.2) pigments.
Figure 4:
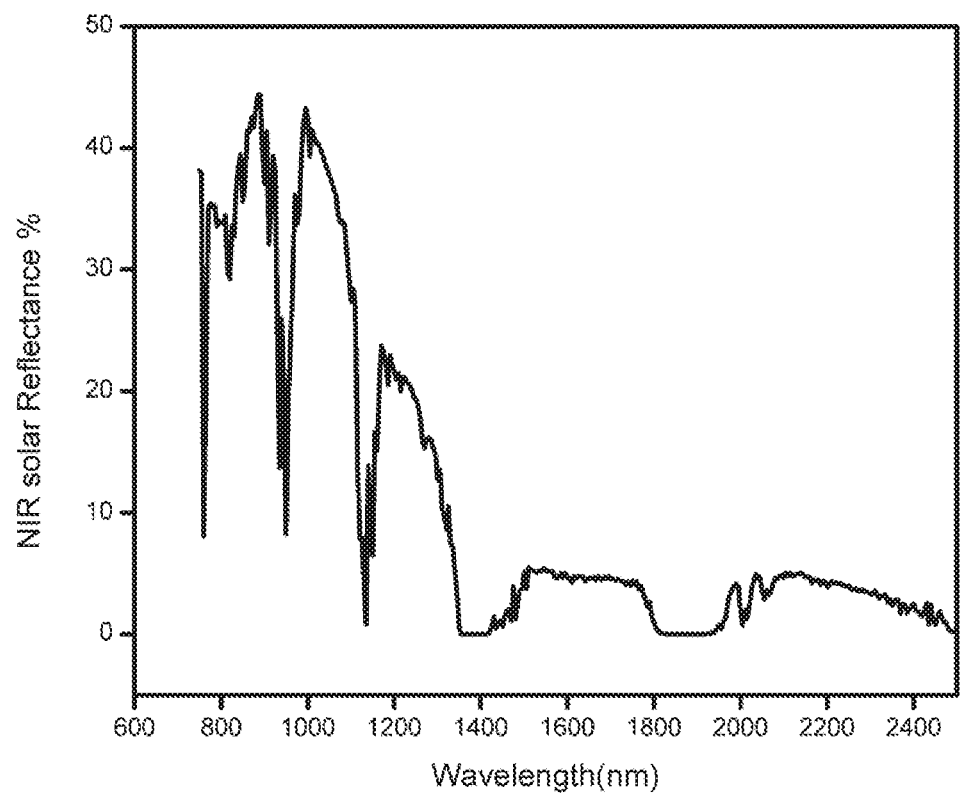
FIG. 4. Solar irradiance spectra of $Mg_{1-x}Co_xWO_4$ (x=0.2) pigments.

Then the pigment was filtered, washed with distilled water, dried and finally weighed. Negligible weight lose was observed for the acid and alkali treated samples. The L*a*b*values are found to be L*=41.53, a*=-3.7, b*=41.16 (x=0.3) and L*=43.04, a*=4.04, b*=42.43 (x=0.3) for HCl and NaOH respectively. The delta E values are found to be within the allowed limit (<5). From this data we can concluded that the synthesized samples are chemically stable. Thermo gravimetric analyses (TGA) were performed (Schimadzu, DTG-60) on all samples in the temperature range 30-200° C., under air atmosphere at a heating rate of 20° C./min shown in FIG. 3. There is an increasing demand to develop new NIR reflective pigments which can be used for cool roof applications. Replacing conventional pigments with "cool pigments" that absorb less NIR radiation can provide coatings similar in color to that of conventional roofing materials, but with higher solar reflectance. Thus we perceived the need to develop new blue coloured NIR reflecting inorganic pigment. From FIGS. 2 & 4 it can be see that corresponding NIR& NIR solar reflectance (R*) of the synthesized $Mg_{0.8}Co_{0.2}WO_4$ pigment is found to be 56% and 28.6%. This observation indicates that synthesized pigment serve as a potential candidate for cool roof applications.

Example 2

Preparation of $Mg_{1-x}Co_xNb_2O_6$ Blue Pigment

This example relates to the preparation of $Mg_{1-x}Co_xNb_2O_6$ (x=0.1, 0.2, 0.3, 0.4 &0.5). MgO (purity 99%)

Figure 5:
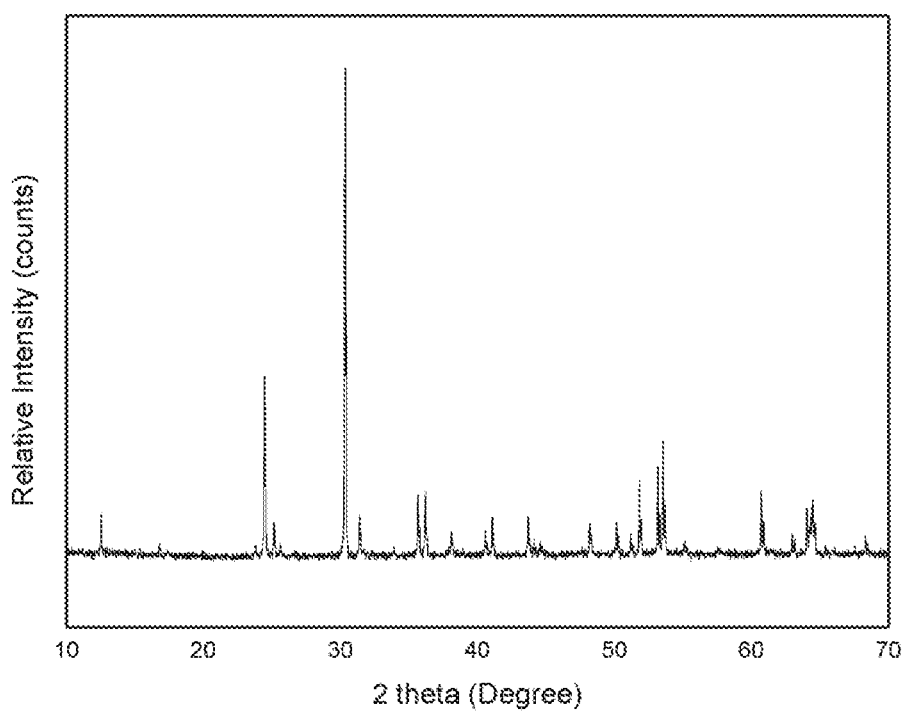
FIG. 5. Powder X-ray diffraction patterns of $Mg_{1-x}Co_xNb_2O_6$ (x=0.5) pigments.
Figure 6:
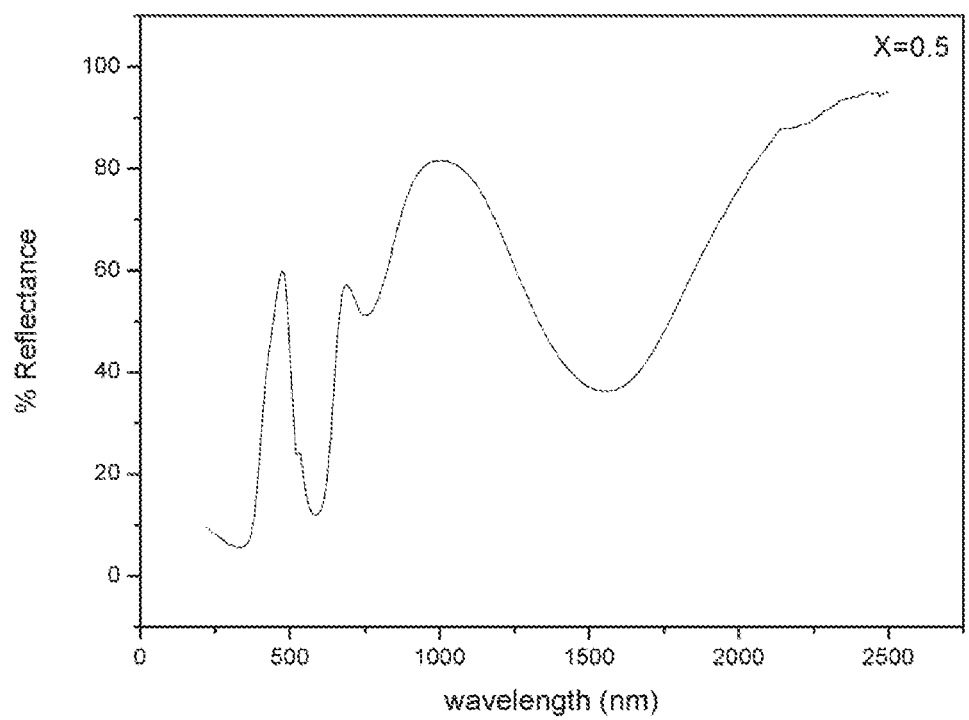
FIG. 6. Diffuse reflectance spectra of $Mg_{1-x}Co_xNb_2O_6$ (x=0.5) pigments.

Nb$_2$O$_5$ (purity 99.995%) and CoO (99.99%) were thoroughly mixed in the stoichiometric ratio in agate mortar with a pestle. The mixture was calcined at 1300° C. for 6 h in air. The obtained powders were examined by means of X-ray powder diffraction (XRD) using Ni filtered CuKα1 radiation with a Philips X'pert Pro diffractometer. Most of the niobium oxides related to AB$_2$O$_6$ Structure have columbite structure with pbcn space group. XRD pattern of the compound depicted in FIG. 5 is in good agreement with the powder X-ray diffraction file: (01-088-0708). Cobalt doped MgNb$_2$O$_6$ crystallizes in orthorhombic structure with pbcn space group. Morphological analysis was performed by means of scanning electron microscope with a JEOL JSM-5600LV SEM. The particle size of the pigment varies in the range 1.5-2.5 μm. Optical reflectance of the powders was measured with UV-Vis spectrophotometer (Shimadzu, UV-2450) using PTFE as a reference is shown FIG. 6. The chromaticity coordinates, determined by the CIE-LAB 1976 colour scales. The values a* (the axis red-green) and b* (the axis yellow-blue) indicate the colour hue. The value L* represents the lightness or darkness of the colour as related to a neutral grey (Table 1). Optical absorption spectra of Mg$_{1-x}$Co$_x$Nb$_2$O$_6$ contains mainly three bands attributed to the three spin allowed transitions. $^4T_{1g}(^4F)$-$^4T_{2g}$(ν$_1$), $^4T_{1g}(^4F)$-$^4A_{2g}$(ν$_2$), $^4T_{1g}(^4F)$-$T_{1g}(^4P)$(ν$_3$). A single very wide band located in the near-IR region around 1500 nm is due to the ν$_i$ transition. The bands at 730 nm, 580 nm is due to the ν$_2$ and ν$_3$ transition.

L*=52.78, a*=−0.97, b*=−36.16 (x=0.5)

Figure 7:
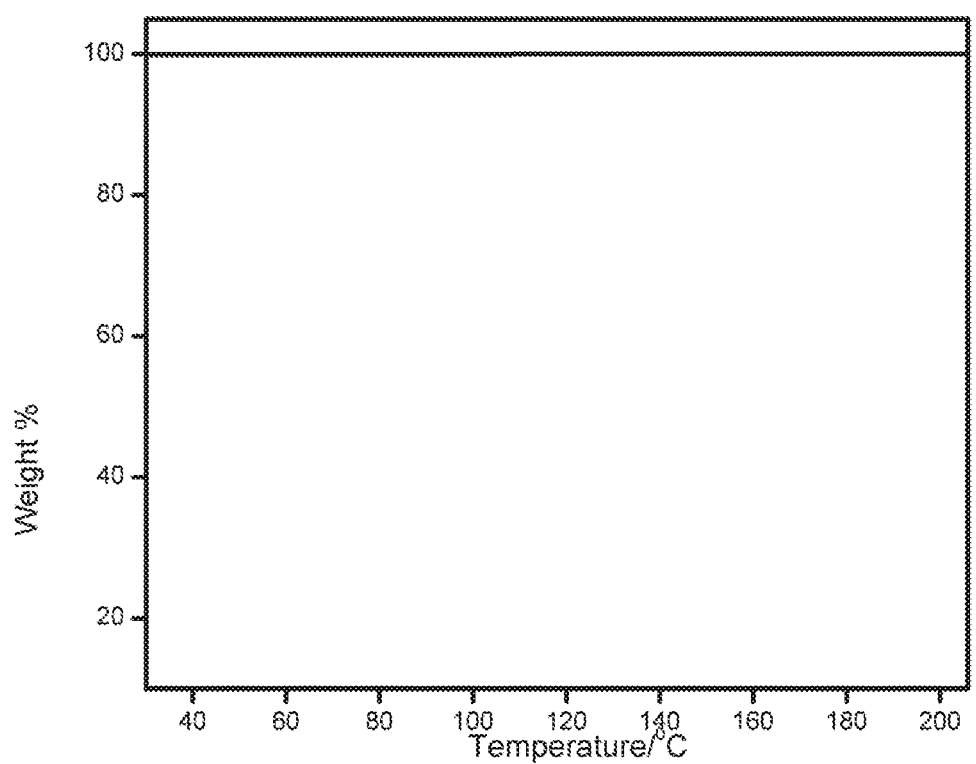
FIG. 7. TGA of $Mg_{1-x}Co_xNb_2O_6$ (x=0.5) pigments.
Figure 8:
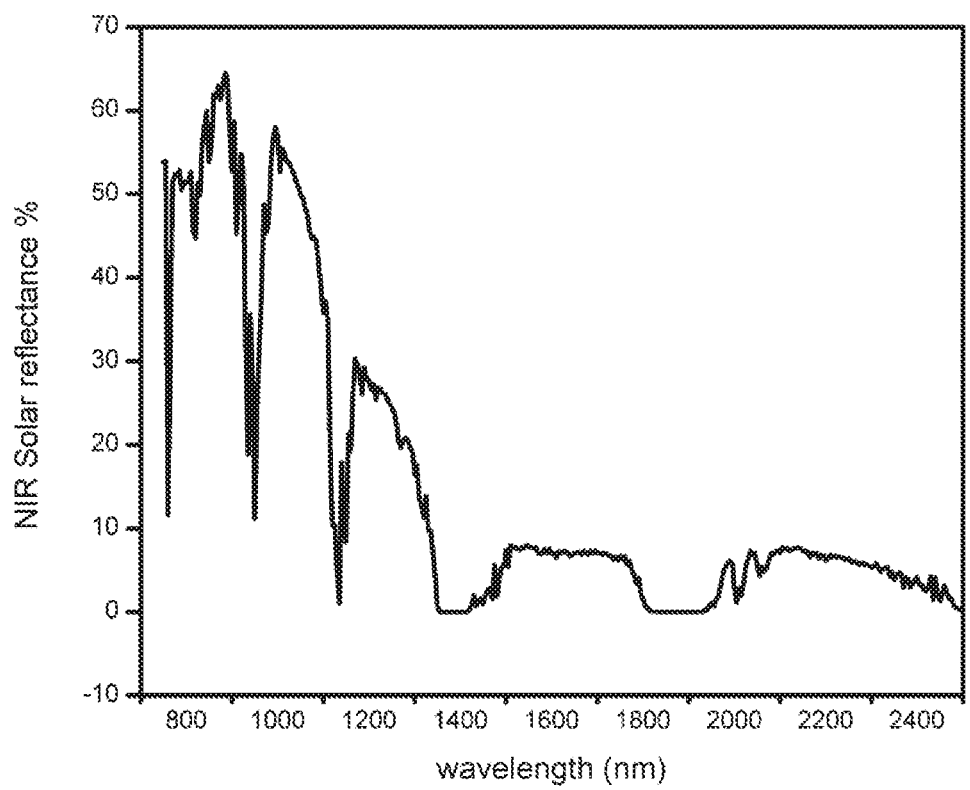
FIG. 8. Solar irradiance spectra of $Mg_{1-x}Co_xNb_2O_6$ (x=0.5) pigments.

For the Purpose of evaluating the chemical and thermal stability of the synthesized pigments, we treated it with acid and alkali (Table 2). For this a small amount of weighed sample is mixed with 2% NaOH and 2% HCl and immersed for 1 hour with constant stirring. Then the pigment was filtered, washed with distilled water, dried and finally weighed. Negligible weight lose was observed for the acid and alkali treated samples. The L*a*b* values are found to be L*=50.62, a*=0.19, b*=−36.19 (x=0.5) and L*=51.23, a*=−0.18, b*=37.08 (x=0.5) for HCl and NaOH respectively. The delta E values are found to be within the allowed limit (<5). From this data we can concluded that the synthesized samples are chemically stable. Thermo gravimetric analyses (TGA) were performed (Schimadzu, DTG-60) on all samples in the temperature range 30-200° C., under air atmosphere at a heating rate of 20° C./min shown in FIG. 7. There is an increasing demand to develop new NIR reflective pigments which can be used for cool roof applications. Replacing conventional pigments with "cool pigments" that absorb less NIR radiation can provide coatings similar in color to that of conventional roofing materials, but with higher solar reflectance. Thus we perceived the need to develop new blue coloured NIR reflecting inorganic pigment. From FIGS. 6 & 8 it can be see that corresponding NIR& NIR solar reflectance (R*) of the synthesized Mg$_{0.5}$Co$_{0.5}$Nb$_2$O$_6$ pigment is found to be 74% and 38%. This observation indicates that synthesized pigment serve as a potential candidate for cool roof applications.

Example 3

Preparation of Mg$_{1-x}$Co$_x$TiO$_3$ Blue Pigment

Figure 9:
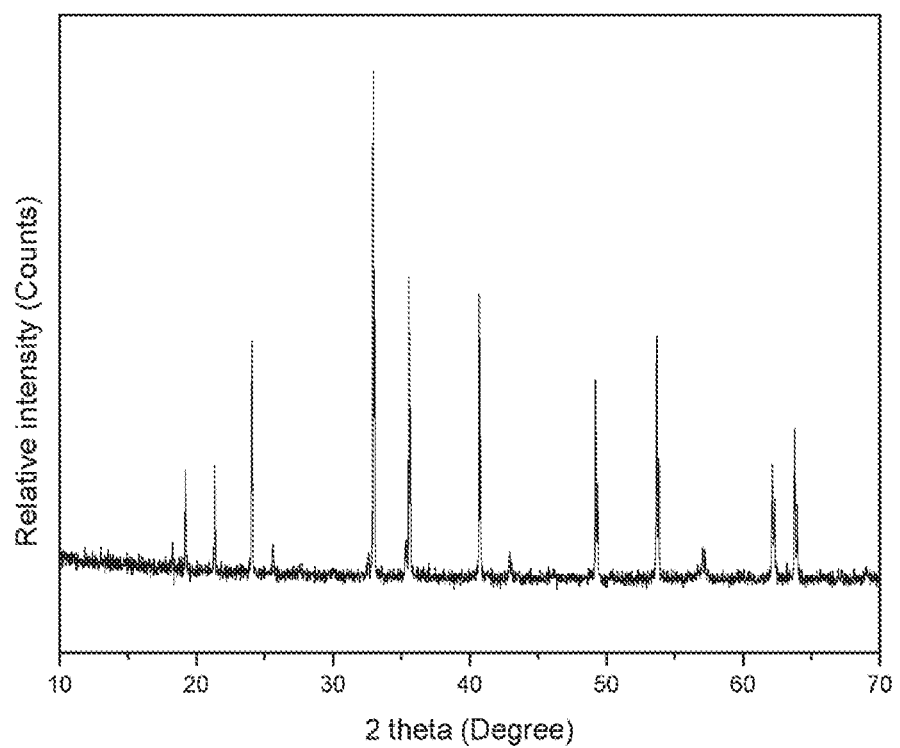
FIG. 9. Powder X-ray diffraction pattern of $Mg_{1-x}Co_xTiO_3$ (x=0.1) pigments.
Figure 10:
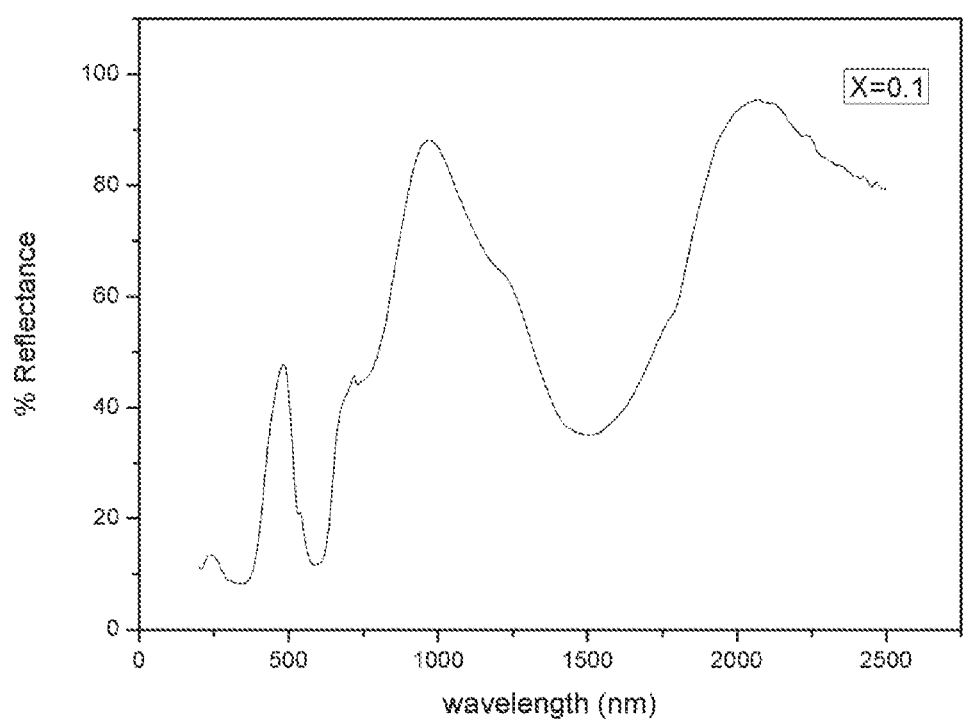
FIG. 10. Diffuse Reflectance spectra of $Mg_{1-x}Co_xTiO_3$ (x=0.1) pigments.

This example relates to the preparation of Mg$_{1-x}$Co$_x$TiO$_3$ (x=0.1, 0.2, 0.3, 0.4 &0.5). MgO (purity 99%), TiO$_2$ (purity 99.995%) and CoO (99.99%) were thoroughly mixed in the stoichiometric ratio in agate mortar with a pestle. The mixture was calcined at 1200° C. for 6 h in air. The obtained powders were examined by means of X-ray powder diffraction (XRD) using Ni filtered CuKα1 radiation with a Philips X'pert Pro diffractometer. Geikielite (MgTiO$_3$) belongs to the ilmenite structure type (ATiO$_3$, A=Mg, Mn, Fe, Zn) with a rhombohedral space group R-3 and 6 formula units per unit cell. FIG. 9 shows the XRD patterns of cobalt doped MgTiO$_3$. All the reflections can be well indexed according to the Powder diffraction file 01-079-0831. The structure of MgTiO$_3$ consists of MgO$_6$ octahedron and TiO$_6$ octahedron. Morphological analysis was performed by means of scanning electron microscope with a JEOL JSM-5600LV SEM. The particle size of the pigment varies in the range 2-4 μm. Optical reflectance of the powders was measured with UV-Vis spectrophotometer (Shimadzu, UV-2450) using PTFE as a reference is shown FIG. 10. The chromaticity coordinates, determined by the CIE-LAB 1976 colour scales. The values a* (the axis red-green) and b* (the axis yellow-blue) indicate the colour hue. The value L* represents the lightness or darkness of the colour as related to a neutral grey (Table 1). The blue colour of the Mg$_{1-x}$Co$_x$TiO$_3$ powders is evident even for very low values of X. The UV-Visible NIR spectrum of Co$^{2+}$ doped MgTiO$_3$ shows that the blue colour is due to the octahedral incorporation of the Co(II). The given spectrum contains mainly three bands attributed to the three spin allowed transitions $^4T_{1g}$ ($^4F$)-$^4T_{2g}$ (ν$_1$), $^4T_{1g}$ ($^4F$)-A$_{2g}$ (ν$_2$), $^4T_{1g}$ ($^4F$)-T$_{1g}$($^4P$) (ν$_3$) appear at 1500 nm, 730 nm and 580 nm respectively.

L*=54.13, a*=−11.04, b*=−25.61 (x=0.1).

Figure 11:
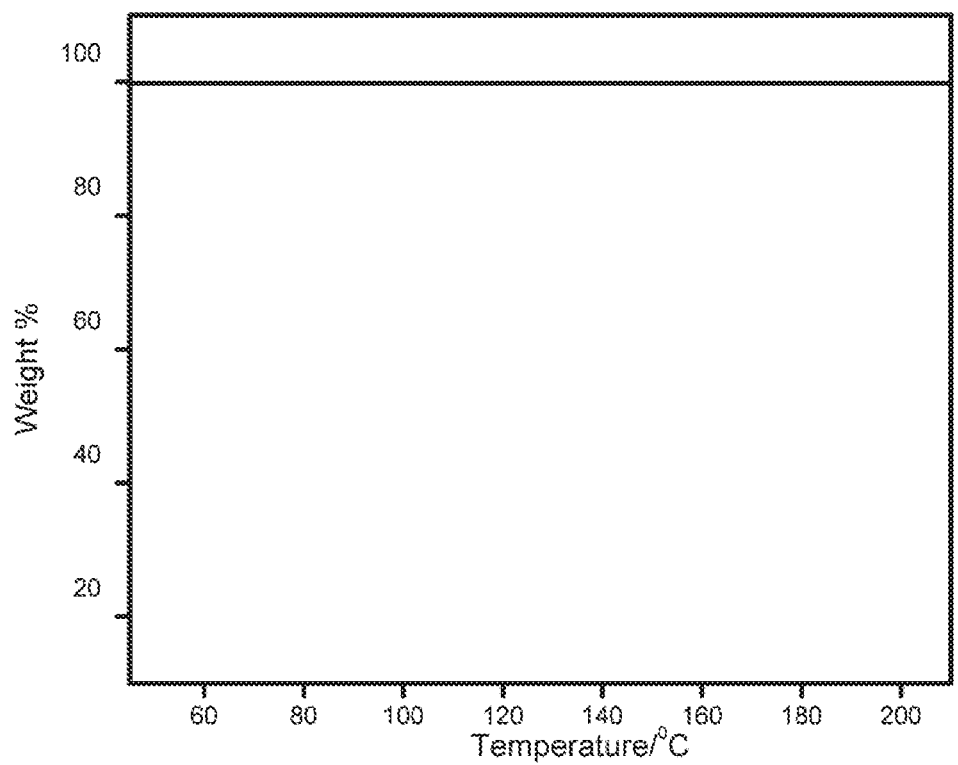
FIG. 11. TGA of $Mg_{1-x}Co_xTiO_3$ (x=0.1) pigments.
Figure 12:
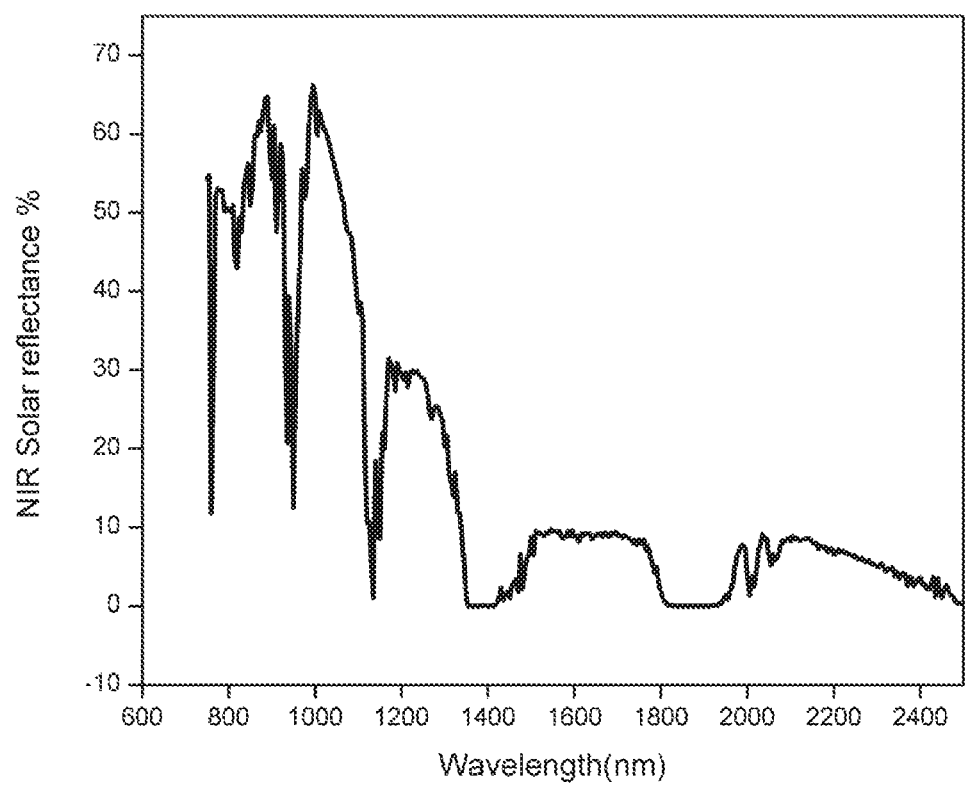
FIG. 12. Solar irradiance spectra of $Mg_{1-x}Co_xTiO_3$ (x=0.1) pigments.

For the Purpose of evaluating the chemical and thermal stability of the synthesized pigments, we treated it with acid and alkali (Table 2). For this a small amount of weighed sample is mixed with 2% NaOH and 2% HCl and immersed for 1 hour with constant stirring. Then the pigment was filtered, washed with distilled water, dried and finally weighed. Negligible weight lose was observed for the acid and alkali treated samples. The L*a*b*values are found to be L*=52.89, a*=−11.07, b*=−25.01 (x=0.1) and L*=56, a*=−11.14, b*=−25.85 (x=0.1) for HCl and NaOH respectively. The delta E values are found to be within the allowed limit (<5). From this data we can concluded that the synthesized samples are chemically stable. Thermo gravimetric analyses (TGA) were performed (Schimadzu, DTG-60) on all samples in the temperature range 30-200° C., under air atmosphere at a heating rate of 20° C./min shown in FIG. 11. There is an increasing demand to develop new NIR reflective pigments which can be used for cool roof applications. Replacing conventional pigments with "cool pigments" that absorb less NIR radiation can provide coatings similar in color to that of conventional roofing materials, but with higher solar reflectance. Thus we perceived the need to develop new blue coloured NIR reflecting inorganic pigment. From FIGS. 10 & 12 it can be see that corresponding NIR& NIR solar reflectance (R*) of the synthesized Mg$_{0.9}$Co$_{0.1}$TiO$_3$ pigment is found to be 73% and 37%. This observation indicates that synthesized pigment serve as a potential candidate for cool roof applications.

Table 1 Explains Colour Co-Ordinates & NIR Reflectance of Typical Compositions

TABLE 1

Colour Co-ordinates & NIR Reflectance of Typical Compositions

| Composition | L* | a* | b* | NIR Solar reflectance (%) |
|---|---|---|---|---|
| Mg$_{0.8}$Co$_{0.2}$WO$_4$ | 46.28 | 6.33 | −46.97 | 28.6%. |
| Mg$_{0.5}$Co$_{0.5}$Nb$_2$O$_6$ | 52.78 | −0.97 | −36.16. | 38% |
| Mg$_{0.9}$Co$_{0.1}$TiO$_3$ | 54.13 | −11.04 | −25.61 | 37% |
| CoAl$_2$O$_4$ Commercial | 44.8 | 2.1 | −32.7 | 29% |

Table 2 Explains Acid & Alkali Tests

| Composition | Acid | | | Alkali | | | ΔE | |
| --- | --- | --- | --- | --- | --- | --- | --- | --- |
| | L* | a* | b* | L* | a* | b* | Acid | Alkali |
| $Mg_{0.8}Co_{0.2}WO_4$ | 41.53 | 3.7 | −41.16 | 43.04 | 4.04 | −42.43 | 2.3 | 1 |
| $Mg_{0.5}Co_{0.5}Nb_2O_6$ | 50.62 | −0.19 | −36.19 | 51.23 | −0.18 | −37.08 | 2.2 | 1.5 |
| $Mg_{0.9}Co_{0.1}TiO_3$ | 52.89 | −11.07 | −25.01 | 56 | −11.14 | −25.85 | 1.3 | 1.8 |

We claim:

1. A Blue pigment having the general formula $Mg_{1-x}Co_xWO_4$ (x=0.1 to 0.5).

2. The Blue pigment according to claim 1 of the formula, $Mg_{1-x}Co_xWO_4$ (x=0.1 to 0.5) having chromaticity coordinates, determined as per the CIE 1976 colour scales are L*=39.01 to 46.28, a*=−0.10 to 6.33, b*=−32.88 to −46.97.

3. The Blue pigment according to claim 1 of the formula, $Mg_{1-x}Co_xWO_4$ (x=0.1 to 0.5) having NIR reflectance of 42 to 56% and NIR solar reflectance of 21 to 28.6%.

4. A Blue pigment having the general formula $Mg_{1-z}Co_xNb_2O_6$ (x=0.1 to 0.5).

5. The Blue pigment according to claim 4 of the formula, $Mg_{1-x}Co_xNb_2O_6$ (x=0.1 to 0.5) having chromaticity coordinates, determined as per the CIE 1976 colour scales are L*=52.78 to 68.05, a*=−0.97 to −2.55, b*=−27.64 to −36.16.

6. The Blue pigment according to claim 4 of the formula, $Mg_{1-x}Co_xNb_2O_6$ (x=0.1 to 0.5) having NIR reflectance of 86 to 74% and NIR solar reflectance of 38 to 43%.

7. A Blue pigment having the general formula $Mg_{1-x}Co_xTiO_3$ (x=0.2, 0.3, or 0.4).

8. The Blue pigment according to claim 7 of the formula, $Mg_{1-x}Co_xTiO_3$ (x=0.2, 0.3, or 0.4) having chromaticity coordinates, determined as per the CIE 1976 colour scales are L*=36.62 to 54.13, a*=−11.04 to −15.73, b*=−11.66 to −25.61.

9. The Blue pigment according to claim 7 of the formula, $Mg_{1-x}Co_xTiO_3$ (x=0.2, 0.3, or 0.4) having NIR reflectance of 46 to 73% and NIR solar reflectance of 23 to 37%.

10. A process for the preparation of a blue pigment comprising Cobalt doped Magnesium and one Transition Element Oxide selected from Tungsten, Niobium and Titanium, comprising the steps of:
    mixing thoroughly MgO (purity 99%), CoO (99.99%) with one of the Transition Element Oxides (purity 99.995%) in a stochiometric ratio in agate mortar with a pestle;
    ii) calcining the mixture at 1100-1300° C. in air atmosphere for 6-12 hrs duration; and
    iii) getting blue pigment in the form of powder having particle size 1-5 μm.

* * * * *